July 3, 1951 R. HOFSTADTER 2,558,850
VERTICAL VELOCITY CONTROL FOR AIRCRAFT
Filed July 22, 1946
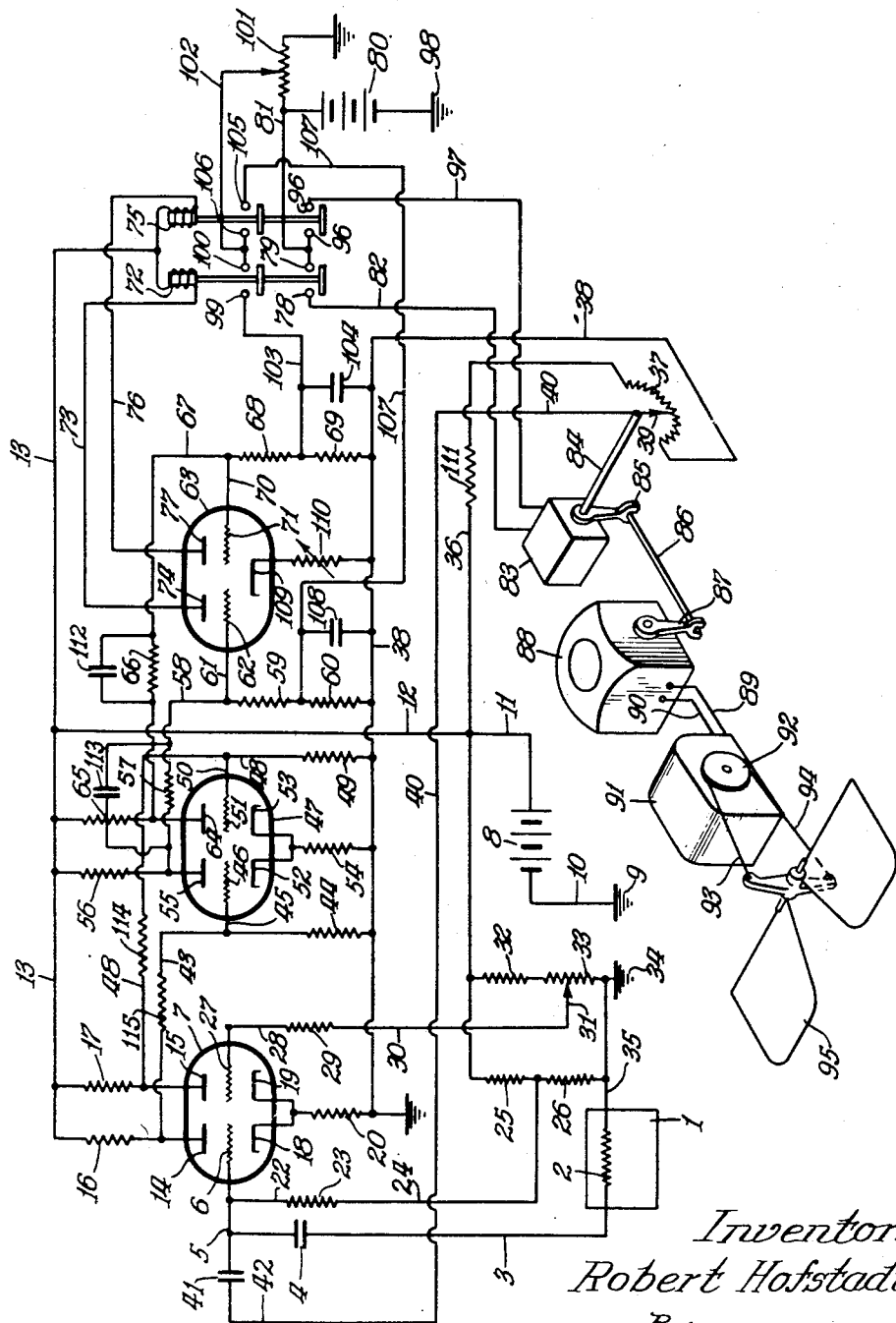
Inventor:
Robert Hofstadter
By
Henry L. Shenier
Atty.

Patented July 3, 1951

2,558,850

UNITED STATES PATENT OFFICE 2,558,850

VERTICAL VELOCITY CONTROL FOR AIRCRAFT

Robert Hofstadter, Forest Hills, N. Y., assignor to The Norden Laboratories Corporation, New York, N. Y., a corporation of Connecticut Application July 22, 1946, Serial No. 685,342

14 Claims. (Cl. 318—481)

My invention relates to a vertical velocity control for aircraft, and more particularly to a control system for controlling an airplane to provide for glide or climb at a predetermined regulated vertical velocity.

In the automatic pilots of the prior art, an airplane may be controlled automatically to fly a predetermined straight course at a level attitude. It is frequently desirable to control an airplane automatically so that it will climb or glide in order that its vertical velocity will be proportional to a desired function of time or any other desired variable or variables. In most systems of the prior art, the pilot must fly the plane to the desired altitude and then make the automatic pilot operative. Similarly, when coming to a landing or reducing altitude, the automatic pilot must be rendered inoperative and the plane flown to the desired altitude by a human pilot.

One object of my invention is to provide a new and improved control system for aircraft whereby an airplane may be automatically controlled to give it a desired vertical velocity either in ascent or descent.

A further object of my invention is to provide an improved automatic control system for airplanes to produce a desired climb or glide in which overrun is obviated.

Other and further objects of my invention will appear from the following description.

The accompanying drawing, which forms part of the instant specification and which is to be read in conjunction therewith, is a circuit diagram showing one embodiment of my invention.

In general my invention contemplates the balancing of a voltage representing the altitude of the airplane through a differentiating circuit against a voltage proportional to the desired vertical velocity so as to produce a signal which is a function of the desired vertical velocity and in the proper direction, which signal is employed as a control signal for the elevator control surfaces of the airplane.

More particularly, referring now to the drawing, an altimeter 1 is of the type capable of producing a voltage across resistor 2 which is proportional to the altitude of the plane, such as the altimeter described in Civil Aeronautics Bulletin No. 29, at pages 86 to 90 inclusive. The altimeter construction forms no part of the instant invention, and any suitable altimeter which will produce a voltage which is proportional to the altitude may be employed. The resistor 2 is disposed so that its positive side is connected by conductor 3 to a capacitor 4. The other side of the capacitor is connected by conductor 5 to the grid 6 of the thermionic tube 7, which is shown as a twin triode. A plate battery 8 has its negative terminal connected to ground 9 by conductor 10. The positive terminal is connected by conductors 11, 12, and 13 to anodes 14 and 15 through resistors 16 and 17. The cathodes 18 and 19 of the tube 7 are connected by resistor 20 to ground 21. The grid 6 is also connected by conductor 22 to a grid resistor 23, the other side of which is connected by conductor 24 to the midpoint between resistors 25 and 26. Grid 27 of tube 7 is connected by conductor 28 to a grid resistor 29, the other side of which is connected by conductor 30 to a variable arm 31 adapted to contact the voltage dividing resistors 32 and 33, whose values correspond to resistors 25 and 26 respectively. The lower end of resistor 26 and the lower end of resistor 33 are connected to ground 34. The negative side of the altimeter resistor 2 is connected by conductor 35 to ground 34. The positive terminal of battery 8 is connected by conductor 36 and resistor 111 to a voltage divider 37, the other side of which is connected to ground by conductor 38. The variable arm 39, which is associated with the voltage divider 37, is connected by conductor 40 to one side of a capacitor 41, the other side of which is connected by conductor 42 to the grid 6 of the thermionic tube 7. The resistor 111 governs the amount of the anticipating voltage and is designed to suit the particular aircraft with which the control system is used. As current flows through the circuit of anode 14, a potential will be developed across the resistor 16. This potential is impressed through resistor 115 and is led by conductor 43 across the resistor 44 to conductor 38 and thence to ground. The potential developed across resistor 44 is applied by conductor 45 to the grid 46 of a second twin triode 47. Similarly, when current flows through the anode circuit of anode 15, a voltage will be developed across the resistor 17. This voltage is applied through resistor 114 by conductor 48 to one side of a resistor 49, the other side of which is connected to conductor 38 and ground. The voltage developed across the resistor 49 is applied by a conductor 50 to the other grid 51 of the tube 47. The cathodes 52 and 53 of the tube 47 are connected by a self biasing resistor 54 to conductor 38 and thence to ground.

When current flows through the circuit of anode 55 of tube 47, a potential is developed across resistor 56. This potential is led through resistor 57, through conductor 58, across resistors 59 and 60, to conductor 38, and thence to ground. The resistor 57 is shunted by an anticipating capacitor 113 to compensate for servomotor delay. The resistor 57 may be one having non-linear resistance characteristics such that above a critical voltage the resistance falls considerably and hence acts as a stabilizing resistor. The voltage developed across resistors 59 and 60 is applied by conductor 61 to the grid 62 of thermionic tube 63. Similarly, when current flows through the circuit of anode 64 of tube 47, a potential is developed across the resistor 65. This potential is led through resistor 66 and conductor 67, through resistors 68 and 69, to conductor 38, and thence to ground. The resistor 66 is paralleled by a capacitor 112 to serve as an anticipating condenser for the servomotor delay. The resistor 66 is similar to the resistor 57. Potential developed across resistors 68 and 69 is applied by conductor 70 to the grid 71 of the tube 63. The plate potential existing in conductor 13 is led through winding 72 of a relay, through conductor 73, to the anode 74 of the tube 63. Similarly, the plate potential existing in conductor 13 is led through winding 75 of a relay coil, through conductor 76, to the anode 77 of the tube 63. Upon the energization of relay winding 72 a circuit is closed across contacts 78 and 79 so that current will flow from the battery 80, through conductor 81, through conductor 82, to an attitude servomotor 83. The servomotor 83 is adapted to rotate a shaft 84 to which the variable arm 39 is attached. It is also adapted to operate an arm 85 which is connected by link 86 to an arm 87 of the gyroscope automatic pilot 88. The automatic pilot 88 produces an output signal which is led by conductors 89 or 99 to a control servomotor 91 which is adapted to drive a control drum 92 to operate control wires 93 and 94 of the airplane elevator 95. When the winding of relay 75 is energized a circuit will be closed across contact points 96 so that current will flow from the battery 80, through conductor 81, through conductor 97, to operate the attitude servomotor 83 in the opposite direction from that which occurred when current was passed through conductor 82, the circuits being completed in each case to ground 98.

The operation of relay 72 further will close a circuit across contact points 99 and 100. When this occurs, current will flow from the battery 80 across voltage divider 101, through conductor 102, through conductor 103, through resistor 69, to conductor 38, and thence to ground. It will be observed that resistor 69 is shunted by a capacitor 104 to provide a transient path for a rapid change of potential upon the closing of the circuit. After the capacitor 104 is charged, the voltage drop across resistor 69 is applied to the grid 71 to alter its bias. The capacitor 104 is placed across the resistor 69 and the value of its capacity is such as to give a time constant in the circuit to produce the least sparking. This result is achieved due to the fact that the condenser will hold the voltage at the grid for a fraction of time after the relay opens. In this way the relay acts more positively for longer intervals, both in opening and in closing, thus eliminating chattering and sparking of the relay contact points. The values of the resistance 69 and capacity of the by-pass capacitor 104 will vary according to the speed of the attitude servomotor 83. Such circuit, however, is needed only for slow servomotors.

Similarly, the energization of relay winding 75 will close the circuit across contact points 105 and 106 whereby current will flow from the battery 80 through voltage divider 101, through conductor 102, through conductor 107, through resistor 60 to ground. A capacitor 108 similar to capacitor 104 provides a path for the transient current while the voltage is changing. Upon the closing of the circuit, after the condenser 108 is charged, the voltage drop across resistor 60 is applied to the grid 62 to change its bias.

The common cathode 109 of the tube 63 is connected to ground through variable resistor 110 and conductor 38. The current level which is to flow in windings 72 and 75 of the relays is governed by the value of the resistor 110.

In operation let us assume that the variable arm 31 is adjusted to the midpoint between resistors 32 and 33 so that resistance 25 equals resistance 32, and resistance 26 equals resistance 33. Let us assume further that the airplane is in level flight at a constant altitude. The voltage drop across resistor 26 is impressed upon grid 6, and the voltage drop across resistor 33 is impressed upon the grid 27. These voltages are equal so that equal small currents flow through the circuits of anodes 14 and 15. Accordingly, there are equal voltage drops across resistors 16 and 17, and equal large potentials applied to both grids 46 and 51. It follows, therefore, that there will be equal currents flowing through anode circuits of anodes 55 and 64. These anode currents will produce equal voltage drops across resistors 56 and 65 so that equal small potentials will be applied to grids 62 and 71 of tube 63. The current levels in the circuits of anodes 74 and 77 of tube 63 are such as to be insufficient to energize the windings 72 and 75 under these conditions.

The potential developed across resistor 2 of the altimeter 1 is isolated by the capacitor 4 from the grid 6 so that for a steady state this potential has no effect upon the grid 6.

It will be observed that the circuit will not control the airplane as a function of any predetermined altitude, but the arrangement is such that it will resist changes in altitude due to external factors though it wil not restore the aircraft to any specific altitude.

For example, let us now assume that the airplane flies through an upcurrent of air so that the altitude of the airplane is increasing. The increase in potential across resistor 2 being a transient is passed through capacitor 4 and applied to the grid 6. This increases the current flowing through the circuit of anode 14 and reduces the positive potential which is applied to grid 46. The increase in the current in anode circuit 14 increases the voltage across cathode resistor 20 so that the current flowing through the circuit of anode 15 is reduced. This reduces the potential drop across resistor 17 and hence increases the potential applied to the grid 51 of the tube 47. Accordingly, the current flowing through the circuit of anode 55 will be decreased, and the current flowing through the circuit of anode 64 will be increased. The decrease of the current of anode 55 will decrease the potential drop across resistor 56 and result in the application of the increased potential upon the grid 62 of control tube 63. The increase in the current flowing through the circuit of anode 64 will increase the potential drop through resistor 65 and result in the application of a reduced potential upon the grid 71 of control tube 63. Accordingly, an increased current will flow through the circuit of the anode 74 and through winding 72, energizing the relay to close the circuit across contact points 78 and 79. This permits current to flow through conductor 82 and operate the attitude servomotor to rotate shaft 84 in a counter-clockwise direction, moving the link 86 forwardly to control the gyroscope 88 to operate the servomotor 91 to rotate the elevators 95 in a counter-clockwise direction, thus controlling the plane to nose it downwardly to counteract the increase in altitude. It will be observed that the above operation places a reduced potential upon the grid 71 so that when the increase in altitude is corrected, there is apt to be delay which will cause an overrun of the attitude servomotor. Let us now consider the action which results from the closing of the circuit through contact points 99 and 100. When this occurs, positive potential taken from the voltage divider 101 is applied immediately across the capacitor 104, quickly charging it and applying a positive potential upon the grid 71. After the capacitor 104 is charged, it discharges through the resistor 69 and the voltage drop across resistor 69 is applied to the grid 71, conditioning it to reverse the action of control tube 63 with a minimum of delay. The positive potential furthermore upon grid 71 increases the current flowing through the circuit of anode 77, which increases the positive bias upon the cathode 109 and thus reduces the current flowing through the circuit of anode 74, again tending to prevent overrun of the attitude servomotor.

Let us now consider the action when the airplane flies through an area of downdraft which causes the airplane to lose altitude. The potential across the resistor 2 of the altimeter 1 will be reduced and the drop in potential is reflected upon grid 6 since the capacitor 4 will pass transients. The reduction of potential upon the grid 6 of the tube 7 will reduce the current flowing through the circuit of anode 14, thus reducing the potential drop across the resistor 16 and increasing the potential applied to the grid 46 of tube 50. The reduction in the current through the circuit of anode 14 furthermore reduces the cathode bias which is the potential drop across the resistor 20. This increases the current flowing through the circuit of anode 15 and increases the potential drop across the resistor 17 so that a smaller potential is now applied to the grid 51 of mixer tube 47. The increase of grid potential upon grid 46 increases the current in the circuit of anode 55 and increases the potential drop across the resistor 53, thus reducing the potential applied to the grid 62 of control tube 63. Similarly, the reduction in the current of the circuit of anode 64 reduces the potential drop across resistor 65, and hence increases the potential applied to the grid 71 of control tube 63. The increase in potential upon the grid 71 causes an increase in the current flowing through the circuit of anode 77, which includes the winding 75 of the relay. This closes the circuit across contact points 96 and energizes the attitude servomotor 83 to rotate in a clockwise direction, moving the link 86 rearwardly and causing the servomotor 91 to rotate the elevators 95 in a clockwise direction to bring the nose of the plane upwardly.

The energization of the winding 75 also closes the circuit across contact points 105 and 106 to impress a positive potential across condenser 108 and upon the grid 62 of tube 63 in a manner similarly described above with respect to grid 71.

It will be observed that when the airplane moved to a higher altitude by extraneous forces, the shaft 84 was rotated in a counter-clockwise direction. This moved the arm 39 along the voltage divider 37 so that a more positive potential was impressed upon conductor 40, the transient passing through capacitor 41 to the grid 6. It will be remembered that upon the increase in altitude the grid 6 was at an increased potential. The effect of the application of the transient positive potential upon the grid conditions the grid, anticipating its return to a more positive potential by a reduction in the velocity of altitude increase.

In an analogous manner, upon a reduction of the altitude of the airplane, the shaft 84 was rotated in a clockwise direction, reducing the potential applied to conductor 40 and hence reducing the potential applied to the grid 6, which is at a decreased positive potential when the altitude of the airplane is decreasing. This reduction in the grid potential of grid 6 anticipates the condition of the grid potential which will be brought about by a reduction of the rate of altitude loss. This arrangement prevents overrun of the aircraft.

Heretofore it was assumed that the variable arm 31, which controls the potential applied to the grid 27 of the tube 7, was at the midpoint between resistors 32 and 33 in a position balancing the resistors 25 and 26. Let us now move the variable arm 31 downwardly to the position shown in the drawing so that the grid 6 is more positive than the grid 27. This condition, it was pointed out above, occurred when the airplane was moved to a higher altitude by external factors such as an updraft. The correction which took place was to place the plane in a glide. When the resistance of resistor 33 is decreased, therefore, the system will operate as described above to move the elevators to place the plane in a glide, the rate of descent being proportional to the reduction in potential which is applied to the grid 27 by the variable arm 31. The control system will operate to place the plane in a glide such that the rate of descent will product a voltage change across the resistor 2 so that the rate of decrease of the voltage applied to the grid 27 will balance the potential upon grid 6 against the reduced potential applied to grid 27. It will be immediately apparent to those skilled in the art that the variable arm 31 controls the generation of the rate of descent, that is, a rate of decreasing altitude or vertical velocity in a downward direction.

In a similar manner, if the variable arm 31 is moved upwardly to add a portion of the resistor 32 in series with the resistor 33, there will be an increased potential applied to the grid 27. This will produce a condition simulating the descent of the airplane due to external factors, causing the system to operate to place the airplane in a climb. When the rate of climb, that is, the rate of increase of altitude, generates an increased voltage applied upon grid 6 through capacitor 4 to balance the increased potential placed upon grid 27 by the variable arm 31, the rate of climb will be constant agreeable to the increased voltage placed upon grid 27.

The system furthermore is such that the rate of climb determined by the increased voltage applied to grid 27 or the rate of glide determined by the decreased voltage applied to grid 27 will not be exceeded through the overrun resisting characteristics and stabilizing attributes of my control system. In other words, if the ascent of the plane is greater than that called for by the increased voltage applied to grid 27, the action which followed an updraft, described above, will ensue. Similarly, if the rate of glide is greater than that called for by the reduced potential applied to grid 27 by the variable arm 31, the stabilizing action described above with respect to a downdraft will ensue.

It will be apparent to those skilled in the art that by controlling the movement of brush 31 so as to represent a velocity which is a desired function of any variable, the vertical velocity of the aircraft may be similarly controlled.

It will be seen that I have accomplished the objects of my invention. I have provided an improved control system for aircraft whereby an airplane may be automatically controlled to give it a desired vertical velocity either in ascent or descent. The system is such that the desired climb or glide will be produced in a manner as to obviate overrun. My system furthermore resists changes from the predetermined climb or glide and maintains the airplane at the desired vertical velocity in either direction.

While I have described my invention as a control for an aircraft, it will be obvious to those skilled in the art that it may be used to control the rate of any variable which can be represented as a voltage, as, for example, the motion of a body or the control of a submarine in depth.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

Having thus described my invention, I claim:

1. A control system for an aircraft including in combination, means for developing a potential proportional to the altitude of an aircraft, a pair of electron discharge devices each having an anode and a grid, cathodes for each of said electron discharge devices, a self biasing common resistor for said cathodes, means for impressing a fixed biasing potential upon the first grid, means for impressing a biasing potential on the second grid, means for impressing a potential which is a function of the change in said altitude proportional potential with respect to time upon said first grid, aircraft elevator control means responsive to the anode currents of said electron discharge devices, and means for varying the biasing potential on said second grid to determine a desired climb or glide for the aircraft.

2. A control system as in claim 1 in which said elevator control means includes a pair of thermionic tubes having a pair of grids and a pair of cathodes, a self biasing common resistor for said cathodes, a pair of anode resistors disposed in each of the anode circuits of said pair of electron discharge devices, and conductors for impressing the potential across said resistors upon respective grids of said thermionic tubes.

3. A control system as in claim 1 in which said means for impressing a potential which is a function of the change in said altitude proportional potential includes a channel containing a capacitor in series.

4. A control system as in claim 1 in which said elevator control means includes a pair of thermionic tubes having a pair of anodes, a pair of grids, and a pair of cathodes, a common self biasing resistor for said cathodes, resistors in the anode circuits of said first pair of electron discharge devices, respective conducting paths for impressing the voltage drop across respective resistors upon respective grids of said pair of thermionic tubes, a second pair of resistors disposed in respective anode circuits of said pair of thermionic tubes, a pair of control thermionic tubes having a pair of grids and a common self biasing cathode resistor, and conducting paths for impressing the voltage drops across respective second anode resistors upon respective grids of said control thermionic tubes.

5. A control system as in claim 1 in which said elevator control means includes a pair of thermionic tubes having a pair of anodes, a pair of grids, and a pair of cathodes, a common self biasing resistor for said cathodes, resistors in the anode circuits of said first pair of electron discharge devices, respective conducting paths for impressing the voltage drop across respective resistors upon respective grids of said pair of thermionic tubes, a second pair of resistors disposed in respective anode circuits of said pair of thermionic tubes, a pair of control thermionic tubes having a pair of grids and a common self biasing cathode resistor, and conducting paths including resistors having non-linear resistance characteristics for impressing the voltage drops across respective second anode resistors upon respective grids of said control thermionic tubes.

6. A control system as in claim 1 in which said elevator control means includes a pair of thermionic tubes having a pair of anodes, a pair of grids, and a pair of cathodes, a common self biasing resistor for said cathodes, resistors in the anode circuits of said first pair of electron discharge devices, respective conducting paths for impressing the voltage drop across respective resistors upon respective grids of said pair of thermionic tubes, a second pair of resistors disposed in respective anode circuits of said pair of thermionic tubes, a pair of control thermionic tubes having a pair of grids and a common self biasing cathode resistor, conducting paths for impressing the voltage drops across respective second anode resistors upon respective grids of said control thermionic tubes, a pair of relays, means for operating respective relays in response to increases in respective anode currents of said control thermionic tube, and means responsive to the operation of one of said relays for increasing the potential applied to the grid of the control thermionic tube which controls the other of said relays.

7. A control system as in claim 1 in which said elevator control means includes a pair of thermionic tubes having a pair of anodes, a pair of grids, and a pair of cathodes, a common self biasing resistor for said cathodes, resistors in the anode circuits of said first pair of electron discharge devices, respective conducting paths for impressing the voltage drop across respective resistors upon respective grids of said pair of thermionic tubes, a second pair of resistors disposed in respective anode circuits of said pair of thermionic tubes, a pair of control thermionic tubes having a pair of grids and a common self biasing cathode resistor, conducting paths for impressing the voltage drops across respective second anode resistors upon respective grids of said control thermionic tubes, a pair of relays, means for operating respective relays in response to increases in respective anode currents of said control thermionic tube, means responsive to the operation of one of said relays for increasing the potential applied to the grid of the control thermionic tube which controls the other of said relays, said responsive means including a source of potential, a resistor, means for impressing said potential across said resistor, means for connecting said resistor to said grid, and a capacitor in parallel with said resistor.

8. A control system for an aircraft including in combination, means for developing a potential proportional to the altitude of an aircraft, a pair of electron discharge devices each having an anode and a grid, cathodes for each of said electron discharge devices, a self biasing common resistor for said cathodes, means for impressing a fixed biasing potential upon the first grid, means for impressing a biasing potential on the second grid, means for impressing a potential which is a function of the change in said altitude proportional potential with respect to time upon said first grid, aircraft elevator control means responsive to the anode currents of said electron discharge devices, means for varying the biasing potential on said second grid to determine a desired climb or glide for the aircraft, a voltage dividing means, a channel for impressing the voltage produced by said voltage dividing means upon said first grid, and means movable as a function of the movement of the aircraft elevator for controlling said voltage dividing means, the construction being such that a potential is applied to said first grid in a direction to bring its bias to the bias which exists upon said second grid.

9. A control system as in claim 8 in which said voltage impressing channel includes a capacitor.

10. A control system for governing the rate of change of altitude of an aircraft including in combination a bridge network, means for impressing a unidirectional potential across a pair of terminals of said bridge, a pair of thermionic tubes each having a grid, means for connecting the other pair of terminals of the bridge with the respective grids of said tubes, one of said grids being connected to said bridge to provide a fixed grid bias therefor, means for unbalancing said bridge to produce a desired predetermined control signal, means for generating a second signal which is a function of the rate of change of altitude of the aircraft, and means for impressing said second signal upon one of said grids.

11. A control system as in claim 10 including means for generating a third signal which is a function of the rate of adjustment of the elevator control surfaces of an aircraft, and means for impressing said third signal upon one of said grids.

12. A control system for controlling the rate of motion of a moving part including in combination a bridge network, means for impressing a unidirectional potential across a pair of terminals of said bridge, a pair of thermionic tubes each having a grid, means for connecting the other pair of terminals of said bridge to respective grids, means for impressing a predetermined fixed grid bias upon one of said grids, means for unbalancing the bridge to produce a desired predetermined control signal, means for generating a second signal which is a function of the rate of movement of said moving part, and means for impressing said second signal upon one of said grids.

13. A control system as in claim 12 including in combination a control element for controlling the motion of said moving part, means for generating a third signal which is a function of the rate of adjustment of said control element, and means for impressing said third signal upon one of said grids.

14. A control system for controlling a moving part including in combination means for developing a potential proportional to the position of the moving part with respect to a fixed reference, a pair of electron discharge devices each having an anode and a grid, cathodes for each of said electron discharge devices, a self-biasing common resistor for said cathodes, means for impressing a fixed biasing potential upon one of the respective grids, means for impressing a biasing potential upon the other of said respective grids, means for impressing a potential which is a function of the change in position of said moving part with respect to said fixed reference with respect to time upon said first grid, control means responsive to the anode currents of said electron discharge devices for controlling the movement of said moving part, and means for varying the biasing potential of said second grid to determine a desired rate of change in position of said moving part from said fixed reference.

ROBERT HOFSTADTER.

REFERENCES CITED

The following references are of record in the file of this patent:

UNITED STATES PATENTS

| Number | Name | Date |
|---|---|---|
| 2,020,275 | Beers | Nov. 5, 1935 |
| 2,025,218 | Reinkin | Dec. 24, 1935 |
| 2,204,290 | Alkan | June 11, 1940 |
| 2,276,816 | Bagno | Mar. 17, 1942 |
| 2,350,024 | Francis | May 30, 1944 |
| 2,415,429 | Kellogg et al. | Feb. 11, 1947 |
| 2,450,907 | Newton et al. | Oct. 12, 1948 |